US008799680B2

(12) United States Patent
Ferguson et al.

(10) Patent No.: US 8,799,680 B2
(45) Date of Patent: Aug. 5, 2014

(54) TRANSACTIONAL SEALED STORAGE

(75) Inventors: Niels T. Ferguson, Redmond, WA (US);
Stacy N. Stonich, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1582 days.

(21) Appl. No.: 11/227,659

(22) Filed: Sep. 15, 2005

(65) Prior Publication Data
US 2007/0061596 A1    Mar. 15, 2007

(51) Int. Cl.
*G06F 12/14* (2006.01)

(52) U.S. Cl.
USPC ........... 713/193; 707/703; 707/715; 707/826; 705/51

(58) Field of Classification Search
USPC .............. 713/193; 707/703, 715, 826; 705/51
See application file for complete search history.

(56) References Cited

U.S. PATENT DOCUMENTS

| | | | | |
|---|---|---|---|---|
| 5,197,148 | A | | 3/1993 | Blount et al. ............... 395/575 |
| 5,897,638 | A | | 4/1999 | Lasser et al. ................ 707/102 |
| 5,924,094 | A | * | 7/1999 | Sutter .......................... 707/10 |
| 5,937,159 | A | * | 8/1999 | Meyers et al. ................ 726/20 |
| 5,944,821 | A | | 8/1999 | Angelo |
| 6,272,607 | B1 | | 8/2001 | Baentsch et al. ............. 711/162 |
| 6,336,121 | B1 | | 1/2002 | Lyson et al. ................. 707/201 |
| 6,446,092 | B1 | * | 9/2002 | Sutter .......................... 707/203 |
| 6,785,810 | B1 | * | 8/2004 | Lirov et al. ................. 713/165 |
| 6,941,285 | B2 | * | 9/2005 | Sarcanin ....................... 705/67 |
| 7,266,699 | B2 | * | 9/2007 | Newman et al. ............. 713/182 |
| 7,313,679 | B2 | * | 12/2007 | Ranganathan .................. 713/1 |
| 2002/0078244 | A1 | | 6/2002 | Howard ........................ 709/248 |
| 2003/0041045 | A1 | | 2/2003 | Sun |
| 2003/0126163 | A1 | | 7/2003 | Kim et al. ..................... 707/204 |
| 2003/0188179 | A1 | | 10/2003 | Challener et al. ............ 713/193 |
| 2003/0200440 | A1 | * | 10/2003 | England et al. .............. 713/179 |
| 2003/0200450 | A1 | * | 10/2003 | England et al. .............. 713/189 |
| 2003/0225960 | A1 | | 12/2003 | Guu et al. .................... 711/103 |
| 2005/0015218 | A1 | | 1/2005 | Levi et al. .................... 702/186 |
| 2005/0033980 | A1 | | 2/2005 | Willman et al. .............. 713/200 |
| 2005/0039001 | A1 | | 2/2005 | Hudis et al. .................. 713/166 |
| 2005/0086509 | A1 | | 4/2005 | Ranganathan |
| 2005/0108276 | A1 | | 5/2005 | Sriram ......................... 707/102 |

FOREIGN PATENT DOCUMENTS

| | | |
|---|---|---|
| RU | 2004109577 A | 8/2005 |
| WO | WO 03/019445 A1 | 3/2003 |
| WO | WO 2004/114575 A2 | 12/2004 |

OTHER PUBLICATIONS

"Feature Story: ZFS—the last word in file systems" Published Sep. 14, 2004. © 2004 Sun Microsystems Inc. http://web.archive.org/web/20040916071115/http://www.sun.com/2004-0914/feature/.*

Gough, Valient. "EncFS (http://arg0.net/encfs)" Slides from a presentation at the Libre Software Meeting on Jul. 5, 2005. http://www.arg0.net/encfs-presentation.pdf.*

(Continued)

*Primary Examiner* — Darren B Schwartz
*Assistant Examiner* — Thomas Gyorfi
(74) *Attorney, Agent, or Firm* — Tony Azure; Andrew Sanders; Micky Minhas

(57) ABSTRACT

A transactional sealed storage system enables data to be accessed according to transactional properties and also enables access to the data to be restricted to secured applications. The transactional properties according to which the data may be accessed may include, for example, at least some levels of atomicity, consistency, isolation, and durability. The access to the data may be restricted by, for example, employing a double layer security policy that involves encrypting the data and also authenticating any application that requests access to the encrypted data.

13 Claims, 7 Drawing Sheets

(56) References Cited

OTHER PUBLICATIONS

ZoneAlarm documentation compiled between Apr. 12, 2001 and Jun. 4, 2001. © 1999-2001 Zone Labs Inc. Full PDF available at http://www.cogeco.com/files/pdf/internetconn_userguides/za.pdf.*

Menezes et al. "Handbook of Applied Cryptography" © 1997 CRC Press LLC. (780 pages).*

Pearson et al. "Trusted Computing Platforms: TCPA Technology in Context" © 2002 Prentice Hall Inc. 347 pages.*

"How to handle Transactions in Paradox databse?—dBforums" from May 30, 2008 to Jun. 7, 2008 (2 pages) http://www.dbforums.com/corel-paradox/1630811-how-handle-transactions-paradox-database.html.*

Wikipedia article for "Microsoft Jet Database Engine" from Sep. 2, 2005 (7 pages) http://en.wikipedia.org/w/index.php?title=Microsoft_Jet_Database_Engine&oldid=22397299&printable=yes.*

"Database systems" article dated Jun. 26, 2005 by Google (9 pages) http://www.ayton.id.au/gary/it/Delphi/C_DB01.htm.*

Norman, Steve. "Static and Dynamic Linking and GDB: ENEL 315 Lab Tip, Winter 1997" Last modified Jan. 21, 1997 (4 pages) http://enel.ucalgary.ca/People/Norman/enel315_winter1997/linking_and_gdb/.*

Wikipedia article for "Static Build" as published on Aug. 7, 2005. (2 pages) http://en.wikipedia.org/w/index.php?title=Static_build&oldid=20494990.*

"Z-Transaction Processing Facility", IBM Software—Transaction Processing Facility (TPF)—Overview, Dec. 14, 2005 (1 page) http://www-306.ibm.com/software/htp/tpf/.*

"Microsoft Next-Generation Secure Computing Base-Technical FAQ", Jul. 2003, http://www.microsoft.com/technet/archive/security/news/ngscb.mspx, 9 pages.

"Z-Transaction Processing Facility", IBM Software—Transaction Processing Facility (TPF)—Overview, http://www-306.ibm.com/software/htp/tpf/, 1 page, 2005.

Jim Gray, et al., *Transaction Processing: Concepts and Techniques*, Morgan Kaufmann, 1993, ISBN 1-55860-190-1.

U.S. Appl. No. 10/407,117, filed Apr. 4, 2003, England, P.

U.S. Appl. No. 10/406,861, filed Apr. 4, 2003, England, P.

* cited by examiner

TRANSACTIONAL SEALED STORAGE

BACKGROUND

Transactional storage systems generally provide, at least in part, a number of desired transactional properties such as atomicity, consistency, isolation, and durability, often described using the acronym "ACID". In particular, Atomicity refers to the ability to execute a transaction such that either all changes within the transaction are committed or none of the changes within the transaction are committed. The transaction is considered "atomic" because the changes within the transaction are treated as a whole and are not broken down into smaller sub-sets. Consistency refers to the storage system being in a legal state both at the initiation of the transaction and at the completion of the transaction. This means that a transaction cannot break the rules of the storage system, which may be referred to as integrity constraints. For example, if a storage system has a rule that any two files in the same directory must have different names, then any transaction resulting in two files within the same directory having the same name will be aborted.

Isolation refers to the ability to ensure that multiple programs attempting to concurrently modify the storage system state do not interfere with one another. Ideally, the storage system behaves as if the modifications were done in some sequential order, even though the implementation might execute the modifications in parallel. Durability refers to the guarantee that, once a transaction is successfully committed, the transaction will persist and will not be undone. This means, for example, that a committed transaction will survive system failure, and also that a committed transaction will satisfy the integrity constraints of the storage system.

To illustrate some advantages of transactional properties, and, in particular, the property of atomicity, consider an on-line banking application that enables various financial transactions to be performed from a personal computer. This application will store information on the local disk, such as the current state of the bank accounts, records of past transactions on the account, and historical stock price information. Suppose that the application is processing a share purchase, and that the application has updated a bank account with a debit to pay for the newly purchased shares. Also suppose that, just prior to updating a portfolio with the newly purchased shares, there is a power failure on the personal computer. In a non-transactional storage system, after the power comes back, the stored data will indicate a payment for the shares but no shares in the portfolio. Obviously, this scenario may lead to considerable confusion and questions. Most such applications will likely update information in many different places on the disk, and it will likely involve considerable time and effort to find all possible ways in which updates to the disk can fail. Thus, writing special recovery code for each situation is not practical. A transactional storage system solves these problems in a systematic way. Either all the updates are performed or none of them are performed. In either case, the information in the storage system remains consistent.

Some storage systems are only transactional for part of the data which they store. For example, the widely used New Technology File System (NTFS) from MICROSOFT Corp. of Redmond, Wash., is one such partially transactional file system. NTFS is transactional for file meta-data, but does not provide full transactional guarantees for data inside a file. These partially transactional storage systems provide transactional properties to those portions of the stored data for which the benefits of the transactional properties are most advantageous, while not burdening all of the stored data with the administrative complexities associated with a transactional system.

A sealed storage system is a different and more recently introduced storage system that provides different benefits than those of transactional storage systems. The sealed storage system restricts access to underlying data to only a set of one or more secured applications. Restricting access to the data in this manner may, for example, protect against a virus, Trojan program, or other malicious program that may try to change and/or damage the stored data. A sealed storage system may also protect the privacy of its users by helping to maintain the confidentiality of the stored data. In the above example of the financial data, the banking application may be the only secured application that is permitted to read or modify the stored data. This may, for example, protect malicious users from adding a fictitious bill to a list of bills to be paid, otherwise debiting the account in an unauthorized manner, or reading confidential financial transactions.

SUMMARY

A transactional sealed storage system will be described below. The transactional sealed storage system enables data to be accessed according to transactional properties and also enables access to the data to be restricted to secured applications. The transactional properties according to which the data may be accessed may include, for example, at least some levels of atomicity, consistency, isolation, and durability. The access to the data may be restricted by, for example, employing a double layer security policy that involves encrypting the data and also authenticating any application that requests access to the encrypted data. The transactional sealed storage system may be partially transactional, meaning that only a portion of underlying sealed data is accessed according to transactional properties. The transactional sealed storage system may also be partially sealed, meaning that access to only a portion of underlying transactional data will be restricted to secured applications.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION

Figure 1:
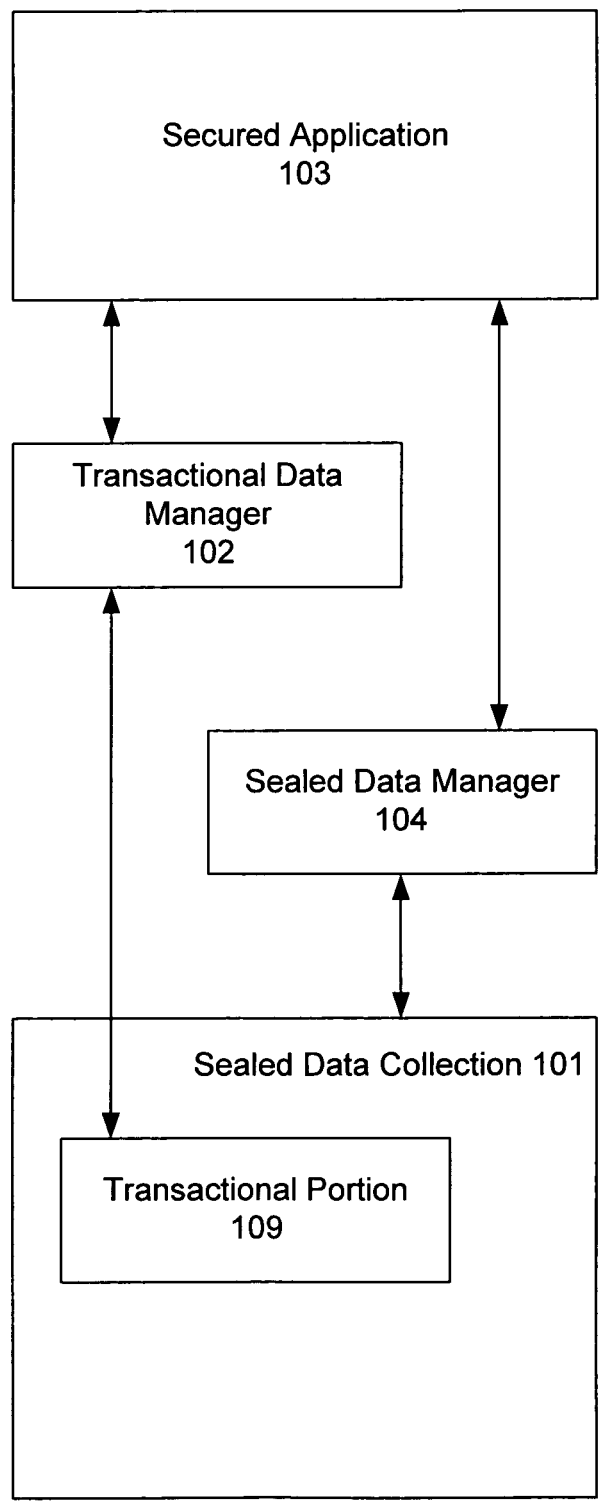
FIG. 1 depicts an exemplary transactional sealed storage system with a transactional storage system on top of a sealed storage system.

A transactional sealed storage system may be implemented using a number of different configurations. One such configuration involves building a transactional storage system on top of a sealed storage system. An example of this configuration is depicted in FIG. 1. As shown, this configuration includes a sealed data collection 101 with a transactional portion 109. Transactional portion 109 may constitute all or less than all of sealed data collection 101.

Sealed data manager 104 regulates access to sealed data collection 101 such that sealed data collection 101 is only accessible to a set of secured applications. The set of secured applications includes at least one application. Thus, although only one secured application 103 is shown in FIG. 1, there may be more than one secured application that can access a sealed data collection. Sealed data manager 104 may run within an operating system or it may constitute an independent operating system in and of itself, which will be referred to as a "secured operating system".

Sealed data manager 104 may regulate access to sealed data collection 101 by, for example, employing a double layer security policy that involves encrypting sealed data collection 101 and also authenticating any application that requests access to the encrypted data. In particular, sealed data manager 104 may hold a cryptographic decryption key that can be used to decrypt the encrypted sealed data collection. Before making this key available to an application that requests access to the sealed data collection 101, sealed data manager 104 may require a verification of the identity of the requesting application. If the identity of the requesting application cannot be verified, then its request to access sealed data collection 101 may be denied.

Sealed data collection 101 may be any collection of data such as, for example, a local disk or a database. Sealed data collection 101 may be only a portion of a greater underlying data collection in which it is stored. For example, sealed data collection 101 may be only a portion of a local disk or a portion of a database, with other portions being available to other non-secured applications.

Transactional portion 109 is a portion of sealed data collection 101 that is accessible according to transactional properties. Such transactional properties may include, for example, at least some levels of atomicity, consistency, isolation, and durability. Transactional portion 109 may, for example, include the portions of sealed data collection 101 for which it would be most beneficial to access data according to transactional properties. Alternatively, transactional portion 109 may, for example, include the portions of sealed data collection 101 for which it is most efficient and/or cost effective to access data according to transactional properties. Transactional portion 109 may include any unit of data organization within sealed data collection 101. For example, if sealed data collection 101 is a relational database, then transactional portion 109 may include units of organization such as complete tables or particular rows or columns of tables.

Transactional data manager 102 manages access to transactional portion 109 according to the transactional properties. Transactional data manager 102 may be, for example, a transactional database management system (DBMS). One such transactional DBMS is SQL Server, from the aforementioned MICROSOFT Corp. of Redmond, Wash.

The data within transactional portion 109 enjoys the efficiency, security, privacy, and other desired benefits associated with both transactional storage and with sealed storage. To illustrate such benefits, consider the scenario in which transactional portion 109 is financial data and secured application 103 is the previously described financial application that can access and manipulate the financial data. In this scenario, the financial data in transactional portion 109 may enjoy transactional benefits such as, for example, protection against the previously described situation in which a financial account is debited to pay for newly purchased shares, but a power failure occurs before the newly purchased shares are recorded in a portfolio. Additionally, the financial data in transactional portion 109 may enjoy security benefits such as, for example, confidentiality, privacy, and protection from unauthorized parties attempting to read the financial data. Moreover, the financial data is protected from viruses, Trojan programs, or other malicious users that could change the financial data by, for example, debiting the account for a non-existent or unauthorized purpose.

A transactional on top of sealed configuration such as that shown in FIG. 1 may be preferable to other configurations because, in addition to sealing the actual data in the transactional sealed storage system, it has the advantage of sealing administrative data about those applications that access the actual data. This sealing of administrative data may be advantageous because, for example, it may retain confidentiality for information about the past activity of secured application 103.

Figure 2:
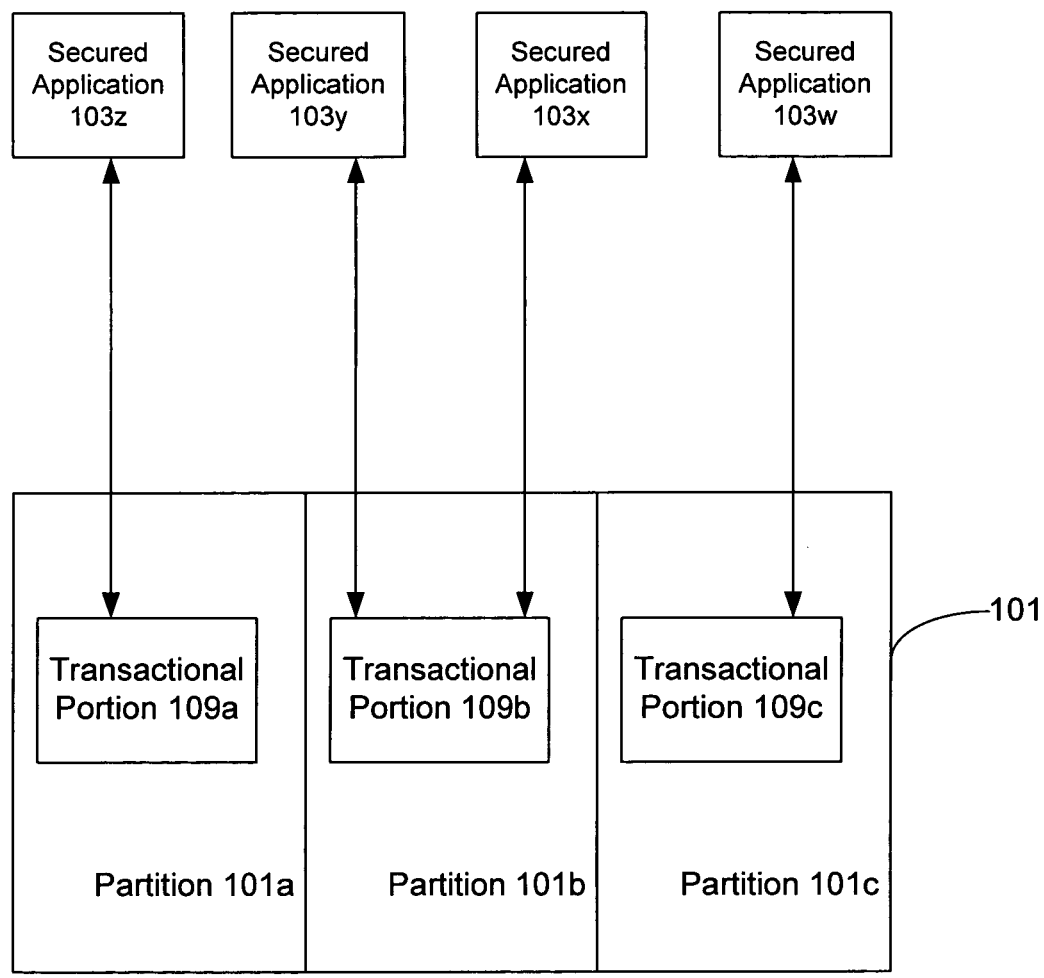
FIG. 2 depicts an exemplary partitioned sealed data collection.

Sealed data collection 101 may be partitioned such that only certain secured applications have access to each partition within the collection. An exemplary partitioned sealed data collection is shown in FIG. 2. As shown, secured application 103z has access to partition 101a, secured applications 103y and 103x have access to partition 101b, and secured application 103w has access to partition 101c. Each partition 101a-c has a corresponding transactional portion 109a-c. Transactional portions 109a-c may include all or less than all of their respective partitions 101a-c. Sealed data manager 104 may hold a corresponding separate set of decryption keys for each of partitions 101a-c, thereby enabling only certain secured applications to access their respective sealed partitions 101a-c. Although not depicted in FIG. 2, a single secured application may have access to more than one partition.

Figure 3:
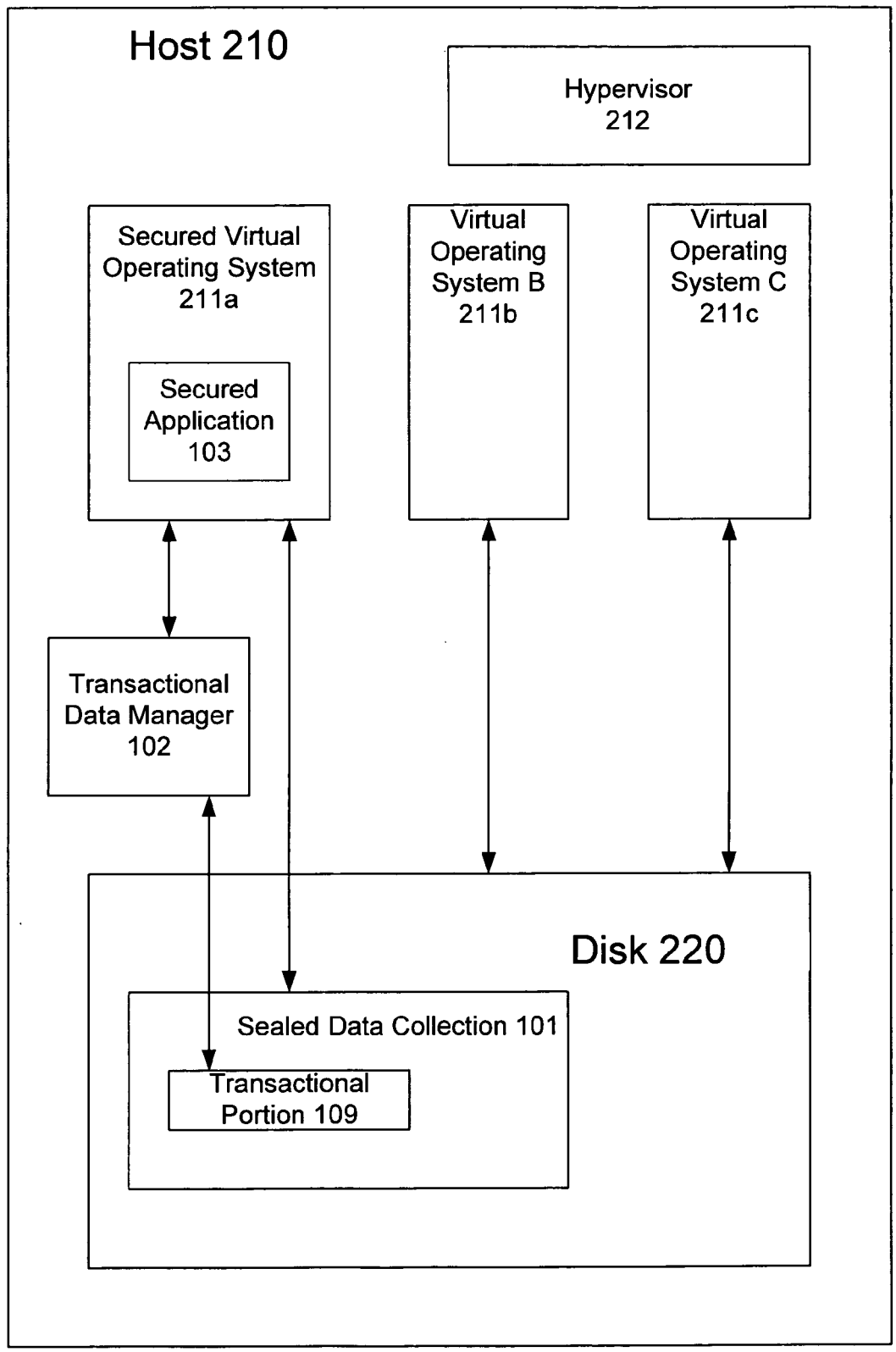
FIG. 3 depicts an exemplary transactional sealed storage system implemented using a secured operating system.

As mentioned above, sealed data manager 104 may itself constitute a secured operating system. In certain instances, a single host computing device may be configured such that multiple "virtual" operating systems may operate simultaneously on the single host. One of these virtual operating systems may be a secured virtual operating system. An exemplary transactional sealed storage system implemented using such a secured virtual operating system is depicted in FIG. 3. As shown, the system of FIG. 3 includes a hypervisor 212, which is a well known software component for managing a number of virtual operating systems 211a-c on a single host computing device 210. Secured virtual operating system 211a is a virtual operating system that provides a secured environment for secured application 103 (and possibly other secured applications if they are present within secured operating system 211a). To provide this secure environment, secured virtual operating system 211a restricts access to sealed data collection 101 to only secured application 103. Virtual operating systems 211b and 211c are other virtual operating systems running on host 210. Host 210 may include any number of virtual operating systems and may include more than one secured virtual operating system.

Sealed data collection 101 is a portion of disk 220. Just as in FIG. 1, sealed data collection 101 includes a transactional portion 109 that is accessible according to transactional properties. Transactional data manager 102 manages access to transactional portion 109 according to the transactional properties. Sealed data collection 101 may be referred to as a "virtual disk" because it is a portion of disk 220 to which access is regulated by secured virtual operating system 211a. Access to other portions of disk 220 may be regulated by other virtual operating systems 211a and 211b. In FIG. 3, disk 220 is depicted as a local disk that is wholly contained within host 210. Such a wholly contained local disk may be, for example, a local hard drive. However, disk 220 need not necessarily be contained within host 210. It is possible that virtual operating systems 211a-c may have access to an external disk. Additionally, while transactional data manager 102 is also depicted as being contained within host 210, transactional data manager 102 may, nevertheless, be external to host 210.

Figure 4:
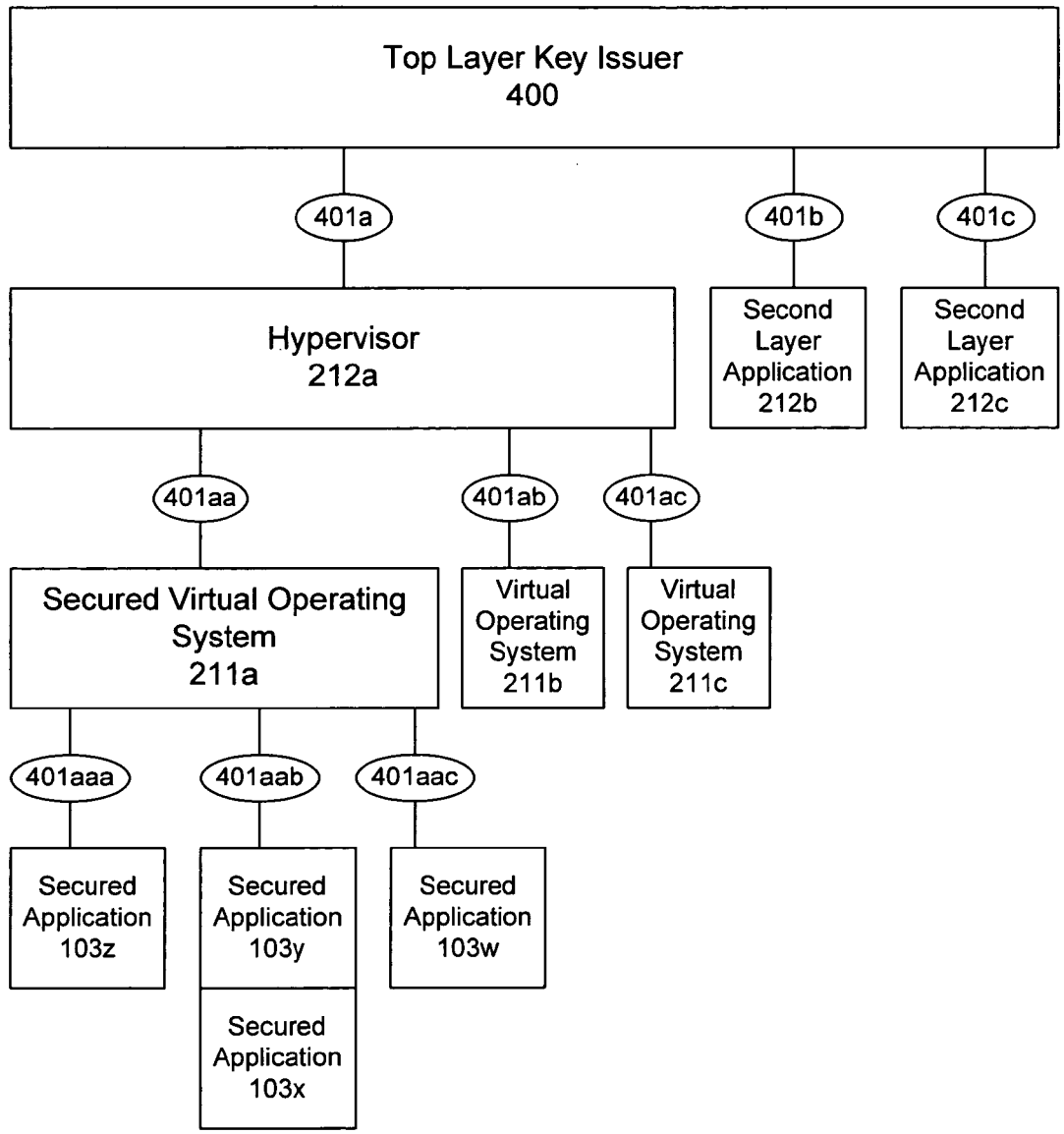
FIG. 4 depicts an exemplary layered security model.

The system of FIG. 3 may be implemented according to a layered security model. An exemplary layered security model is depicted in FIG. 4. At the top layer of the model is a top layer key issuer 400. Top layer key issuer 400 may be, for example, a trusted platform module (TPM). Generally, top layer key issuer 400 issues key sets 401a-c to second layer applications 212a-c, one of which is hypervisor 212a. In particular, key set 401a is issued to hypervisor 212a, key set 401b is issued to second layer application 212b, and key set 401c is issued to second layer application 212c. As should be appreciated, although only three second layer applications 212a-c are shown in FIG. 3, any number of second layer applications may be present. Each of the three key sets 401a-c is a unique and secure key set for its corresponding second layer application 212a-c.

Hypervisor 212, in turn, provides key sets to each of the three virtual operating systems 211a-c on host 210. Hypervisor 212 then issues three separate and unique keys 401aa-401ac. Although not depicted in FIG. 3, the other second layer applications 212c and 212c may issue other keys. Secured virtual operating system 211a, in turn, issues three separate and unique keys 401aaa-401aac. Key 401aaa is used to encrypt partition 101a of FIG. 2, key 401aab is used to encrypt partition 101b of FIG. 2, and key 401aac is used to encrypt partition 101c of FIG. 2. If secured application 103z requests access to partition 101a, secured operating system 211a may then, after authenticating secured application 103z, provide key 401aaa to secured application 103z to decrypt partition 101a. If secured application 103y or 103x request access to partition 101b, secured operating system 211a may then, after authenticating secured application 103x or 103y, provide key 401aab to secured application 103x or 103y to decrypt partition 101b. If secured application 103w requests access to partition 101c, secured operating system 211a may then, after authenticating secured application 103w, provide key 401aac to secured application 103w to decrypt partition 101c.

Figure 5:
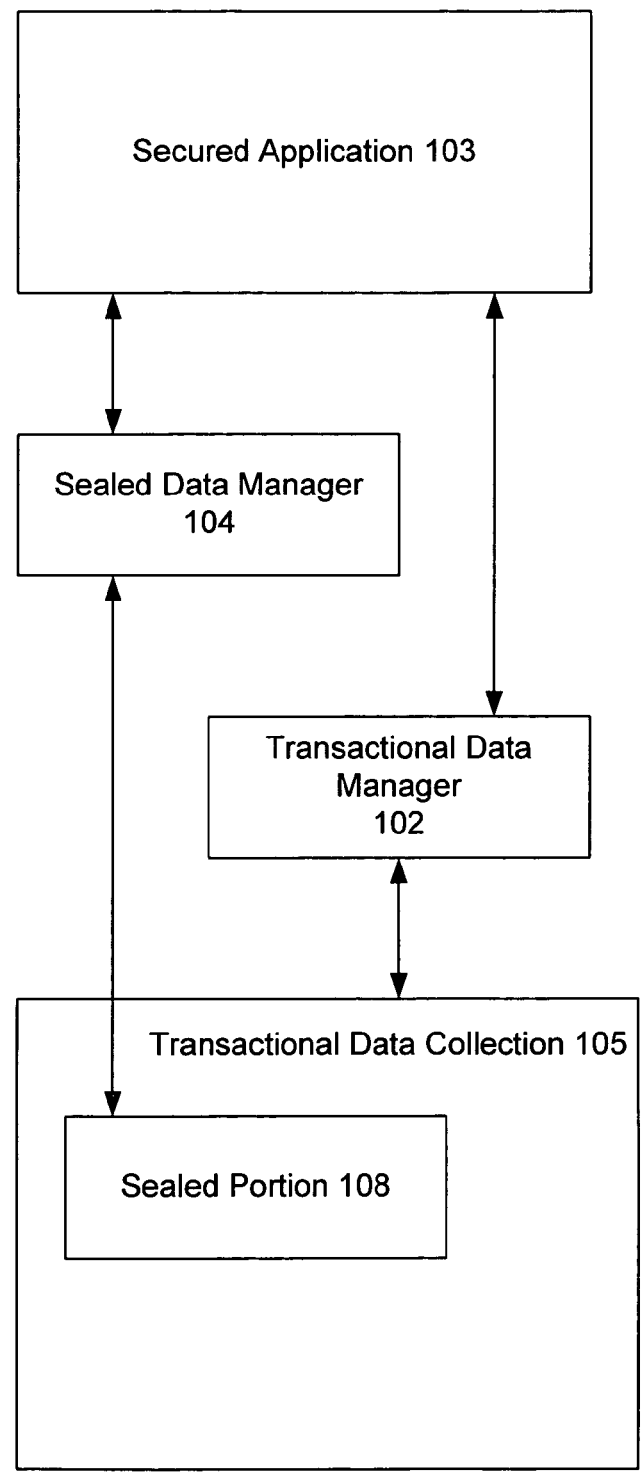
FIG. 5 depicts an exemplary transactional sealed storage system with a sealed storage system on top of a transactional storage system.

In addition to configuring a transactional storage system on top of a sealed storage system, a sealed storage system may also be configured on top of a transactional storage system. An example of this configuration is shown in FIG. 5. The system of FIG. 5 includes a transactional data collection 105 with a sealed portion 108. Sealed portion 108 may constitute all of transactional data collection 105 or less than all of transactional data collection 105.

Transactional data collection 105 may be any collection of data such as, for example, a local disk or a database. Transactional data collection 105 may be only a portion of a greater underlying data collection in which it is stored. For example, transactional data collection 105 may be only a portion of a local disk or a portion of a database, with other portions including non-transactional data.

Sealed portion 108 is a portion of transactional data collection 105 that is only accessible to a corresponding set of one or more secured applications such as secured application 103. Sealed portion 108 may, for example, include the most highly private and confidential portions of transactional data collection 105 for which it would be most beneficial to restrict access and for which the greatest risk would be incurred if data were accessed and/or corrupted by unauthorized parties. Sealed portion 108 may include any unit of data organization within transactional data collection 105. For example, if transactional data collection 105 is a relational database, then sealed portion 108 may include units of organization such as complete tables or particular rows or columns of tables. Just like transactional portion 109 of FIG. 1, the data within sealed portion 108 enjoys the efficiency, security, privacy, and other desired benefits associated with both transactional storage and with sealed storage.

In addition to building a transactional storage system on top of a sealed storage system or vice versa, a transactional sealed storage system may also be implemented, for example, using a "unified" configuration. The unified configuration may be implemented, for example, using a single unified data manager that administers both the transactional aspects and the sealed aspects of the storage system.

Figure 6:
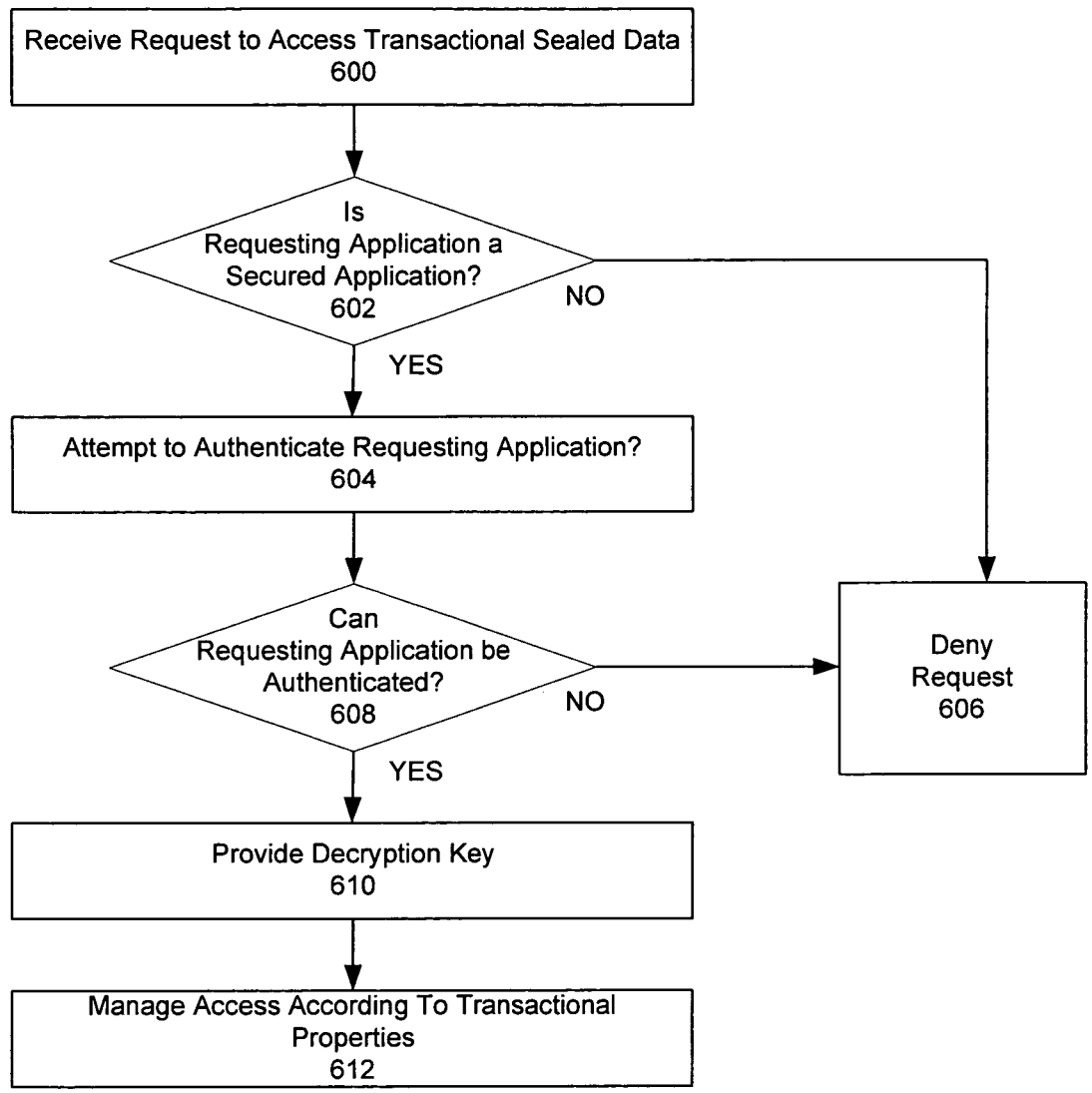
FIG. 6 is a flowchart of an exemplary method for regulating access to transactional sealed data.

A flowchart of an exemplary method for regulating access to transactional sealed data is shown in FIG. 6. At act 600, sealed data manager 104 receives a request from a requesting application to access transactional sealed data. At act 602, sealed data manager 104 determines whether the requesting entity is a secured application. If the requesting application is not a secured application, then its request will be denied at act 606. The determination of whether or not the requesting application is a secured application may be made by, for example, checking a list of secured applications to which the sealed transactional data is available. Of course, the requesting application must be a secured application for the portion of the sealed transactional data to which it requests access. For example, referring back to FIG. 2, although application 103z is a secured application, it is only secured for partition 101a. Thus, if secured application 103z requests access to partition 101b, its request will be denied because it is not secured for partition 101b.

If the requesting application is a secured application (or at least purports to be a secured application), then, at act 604, sealed data manager 104 attempts to authenticate the identity of the requesting application. At act 608, it is determined whether the requesting application can be authenticated. If the requesting application cannot be authenticated, then its request is denied at act 606. On the other hand, if the requesting application is authenticated, then the appropriate decryption key is provided to the requesting application at act 610. Then, at act 612, transactional data manager 102 manages the requesting application's access to the transactional sealed data according to transactional properties.

The authentication procedure may be performed by, for example, computing a hash value of an application executable that uniquely identifies the requesting application. The computed has value may then be compared with a stored hash value for the application which the requesting application purports to be. If the values match, then the requesting application is authenticated, and, if not, then the requesting application cannot be authenticated.

As an alternative or in addition to the double layer encryption and authentication policies described above, sealed data manager 104 may employ a number of other techniques to regulate access to sealed data. For example, when it receives requests from an application to read or write data within the sealed data collection, sealed data manager 104 may operate as a filtering proxy. Specifically, sealed data manager 104 may check the access rights of the requesting application and, if the request is allowed, perform the requested operations. Additionally, sealed data manager 104 may instruct underlying hardware or an operating system to grant a secured application access to the sealed data collection. Furthermore, in addition to the double layer encryption and authentication policies described above, other security systems may be employed to prevent rogue programs or applications from modifying encrypted data.

Figure 7:
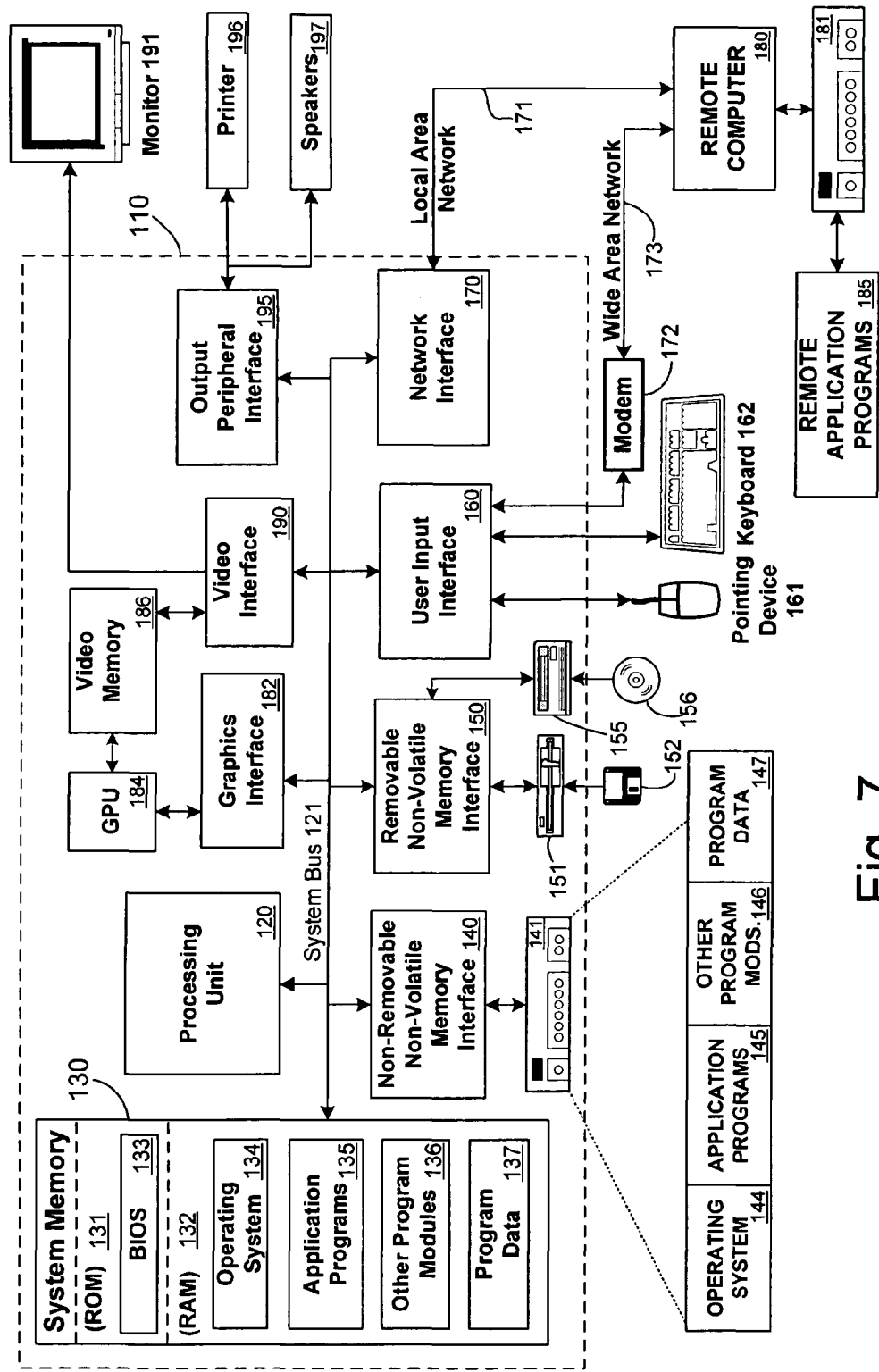
FIG. 7 is a block diagram representing an exemplary computing device.

FIG. 7 illustrates an example of a suitable computing system environment 100 in which the subject matter described above with reference to FIGS. 1-6 may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 7, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

The computer 110 may also include other removable/non-removable, volatile/nonvolatile computer storage media. By way of example only, FIG. 7 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7 provide storage of computer readable instructions, data structures, program modules and other data for the computer 110. In FIG. 7, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. A transactional storage system comprising:
    an underlying transactional data collection that is accessed according to transactional properties, the underlying transactional data collection residing in a database and comprising an unsealed portion and a sealed portion; and
    a single unified data manager that provides access to the underlying transactional data collection,
    wherein the single unified data manager restricts access to the sealed portion such that the sealed portion is only accessible by at least one secured application; and
    wherein the single unified data manager provides access to the underlying transactional data collection, including both the sealed portion and the unsealed portion, according to the transactional properties.

2. The system of claim 1, wherein the sealed portion of the underlying transactional data collection is encrypted.

3. The system of claim 2, further comprising a decryption key which is accessible to the at least one secured application.

4. The system of claim 3, wherein the single unified data manager regulates access to the decryption key by authenticating a requesting application that attempts to access the decryption key before providing the decryption key to the requesting application.

5. The system of claim 4, wherein the single unified data manager authenticates the requesting application by computing a hash value of an application executable that uniquely identifies the requesting application and comparing the computed hash value to a corresponding stored hash value.

6. A method for regulating access to data, the method comprising:
    receiving, in a computer system, a request from an application to access the data, the data being stored in one of an unsealed portion and a sealed portion of a data collection;
    if the data is stored in the sealed portion, using the computer system to determine whether the application is a secured application;
        if the application is a secured application, then providing the application with access to the data according to transactional properties administered by a single unified data manager; and
        if the application is not a secured application, then denying the request; and
    if the data is stored in the unsealed portion, then providing the application with access to the data according to the transactional properties administered by the single unified data manager that also administers the sealed portion,
    wherein the single unified data manager both restricts access to the sealed portion such that the sealed portion is only accessible by at least one secured application and also provides access to the data collection according to transactional properties.

7. The method of claim 6, wherein providing the application with access to the data comprises providing a decryption key to the application for decrypting the data.

8. The method of claim 6, further comprising authenticating the application by attempting to verify an identity of the application and denying the request if the identity of the application cannot be verified.

9. The method of claim 8, wherein authenticating the application comprises:
    computing a hash value of an application executable that uniquely identifies the application; and
    determining whether the computed hash value matches a stored hash value corresponding to the application.

10. A computer readable storage medium having stored thereon instructions that, when executed by one or more processors of a computer system, cause the computer system to perform operations comprising:
    receiving, in the computer system, a request from an application to access data, the data being stored in one of an unsealed portion and a sealed portion of a data collection;
    if the data is stored in the sealed portion, using the computer system to determine whether the application is a secured application;
        if the application is a secured application, then providing the application with access to the data according to transactional properties administered by a single unified data manager that both restricts access to the sealed portion and also provides access to the data collection according to transactional properties; and
        if the application is not a secured application, then denying the request; and
    if the data is stored in the unsealed portion, then providing the application with access to the data according to the transactional properties administered by the single unified data manager that also administers the sealed portion,
    wherein the single unified data manager both restricts access to the sealed portion such that the sealed portion is only accessible by at least one secured application and also provides access to the data collection according to the transactional properties.

11. The computer readable storage medium of claim 10, wherein providing the application with access to the data comprises providing a decryption key to the application for decrypting the data.

12. The computer readable storage medium of claim 10, wherein the operations further comprise authenticating the application by attempting to verify an identity of the application and denying the request if the identity of the application cannot be verified.

13. The computer readable storage medium of claim 12, wherein authenticating the application comprises:
   computing a hash value of an application executable that uniquely identifies the application; and
   determining whether the computed hash value matches a stored hash value corresponding to the application.

* * * * *